United States Patent [19]

Le Noane et al.

[11] 4,172,746
[45] Oct. 30, 1979

[54] METHOD FOR ON-SITE CONNECTION OF CABLES WITH OPTICAL FIBRES

[76] Inventors: Georges E. Le Noane, Bâtiment C, 43 Ar Sante; André M. Mathern, Route du Busquet, Brelevenez; Gabrielle Morizur, Les Fontaines Bat. L, n. 141, all of Lannion, France, 22300

[21] Appl. No.: 906,375

[22] Filed: May 16, 1978

Related U.S. Application Data

[62] Division of Ser. No. 762,312, Jan. 25, 1977, Pat. No. 4,108,534.

[30] Foreign Application Priority Data

Mar. 31, 1976 [FR] France ................................ 76 09342

[51] Int. Cl.² .......................... G02B 5/16; B65H 69/06
[52] U.S. Cl. ........................................ 156/91; 29/466; 156/158; 156/159; 156/304; 350/96.21; 350/96.22
[58] Field of Search .................. 156/49, 91, 158, 159, 156/296, 304, 258; 350/96.21, 96.22; 29/630 F, 466, 464; 65/4 R, 4 A

[56] References Cited

U.S. PATENT DOCUMENTS

| | | | |
|---|---|---|---|
| 3,455,625 | 7/1969 | Brumley et al. | 350/96.22 |
| 3,969,015 | 6/1976 | Le Noane | 350/96.22 |
| 4,009,931 | 3/1977 | Malsby et al. | 350/96.22 |
| 4,027,938 | 6/1977 | Lewis | 350/96.22 |
| 4,027,945 | 6/1977 | Iverson | 350/96.22 |
| 4,028,162 | 6/1977 | Cherin et al. | 156/158 |
| 4,029,390 | 6/1977 | Chinnock et al. | 156/158 |
| 4,043,854 | 8/1977 | Le Noane etal. | 156/158 |
| 4,047,797 | 9/1977 | Arnold et al. | 350/96.21 |
| 4,088,386 | 5/1978 | Hawk | 350/96.21 |

*Primary Examiner*—Jerome W. Massie
*Attorney, Agent, or Firm*—Abraham A. Saffitz

[57] ABSTRACT

A method for on-site connection of two transmission cables comprising optical fibres, each cable having a protective armouring enclosing a central core provided with regularly spaced grooves on its periphery. Each groove holds a fibre provided with a thin sheath of uniform thickness. After the end of one of the cables has been bared over a given length, the uncovered fibres are moved towards the exterior and secured to a holder surrounding the cable. Thereafter the core is cut perpendicularly to its axis and a grooved portion of an extension core is secured thereto; the fibres are bent back into the grooves in the said portion, and the core portion and the fibres which it bears are cut and subsequently coated with a lubricant. The same operations are performed on the end of the other cable and the two cables are clamped together under a predetermined pressure.

Various devices for the embodiment of the method are described.

2 Claims, 14 Drawing Figures

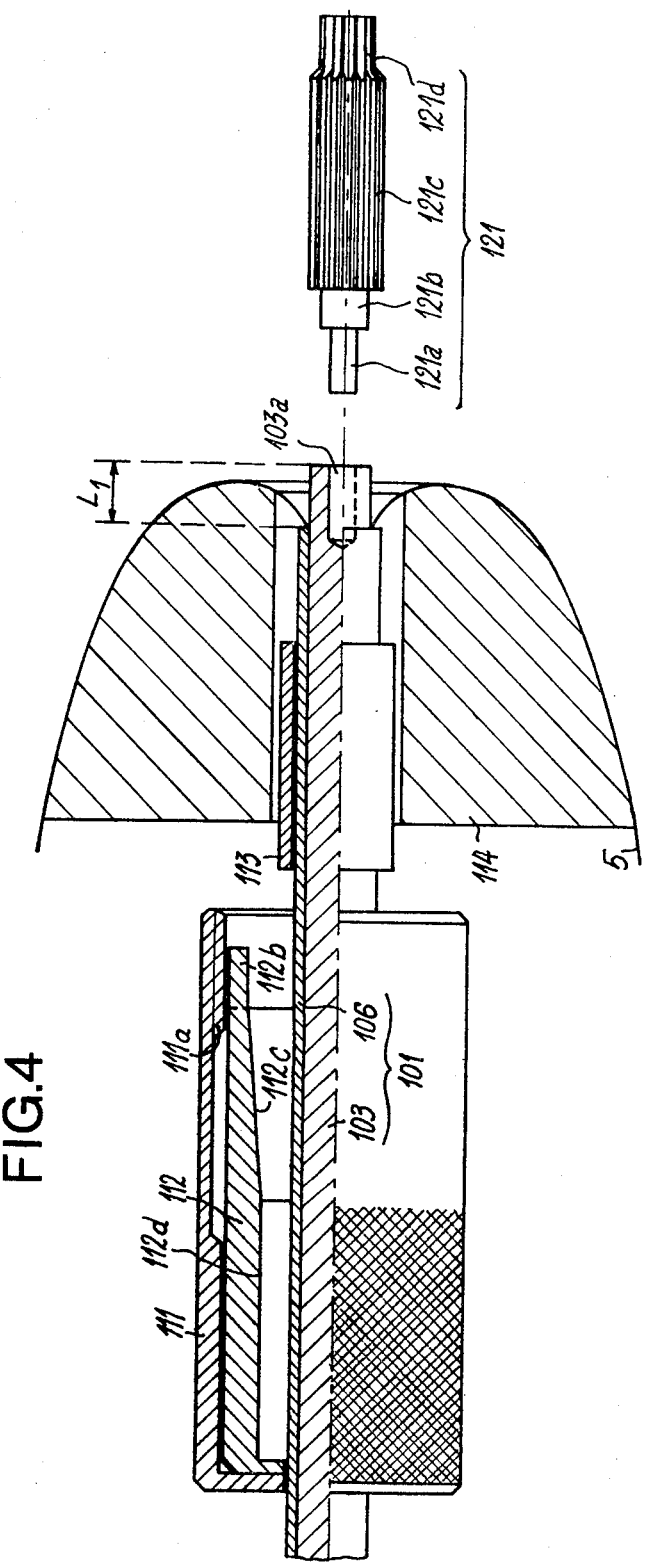
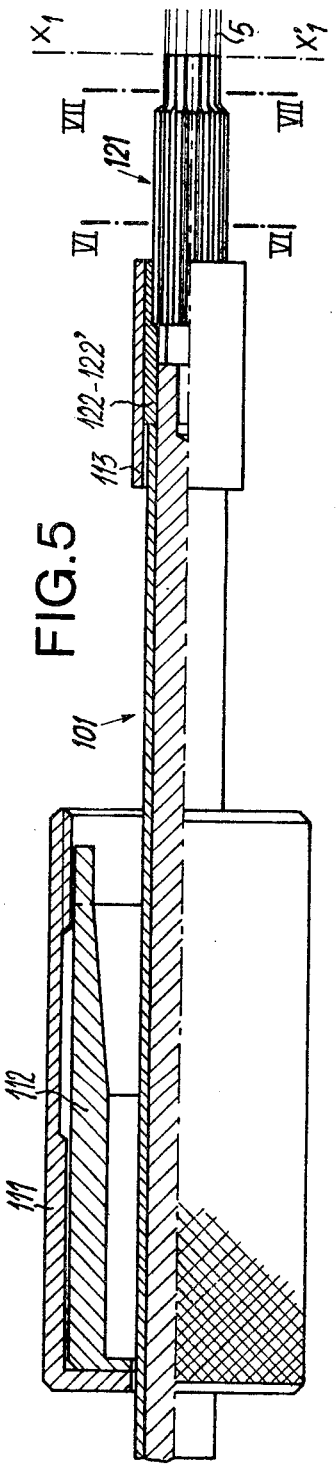

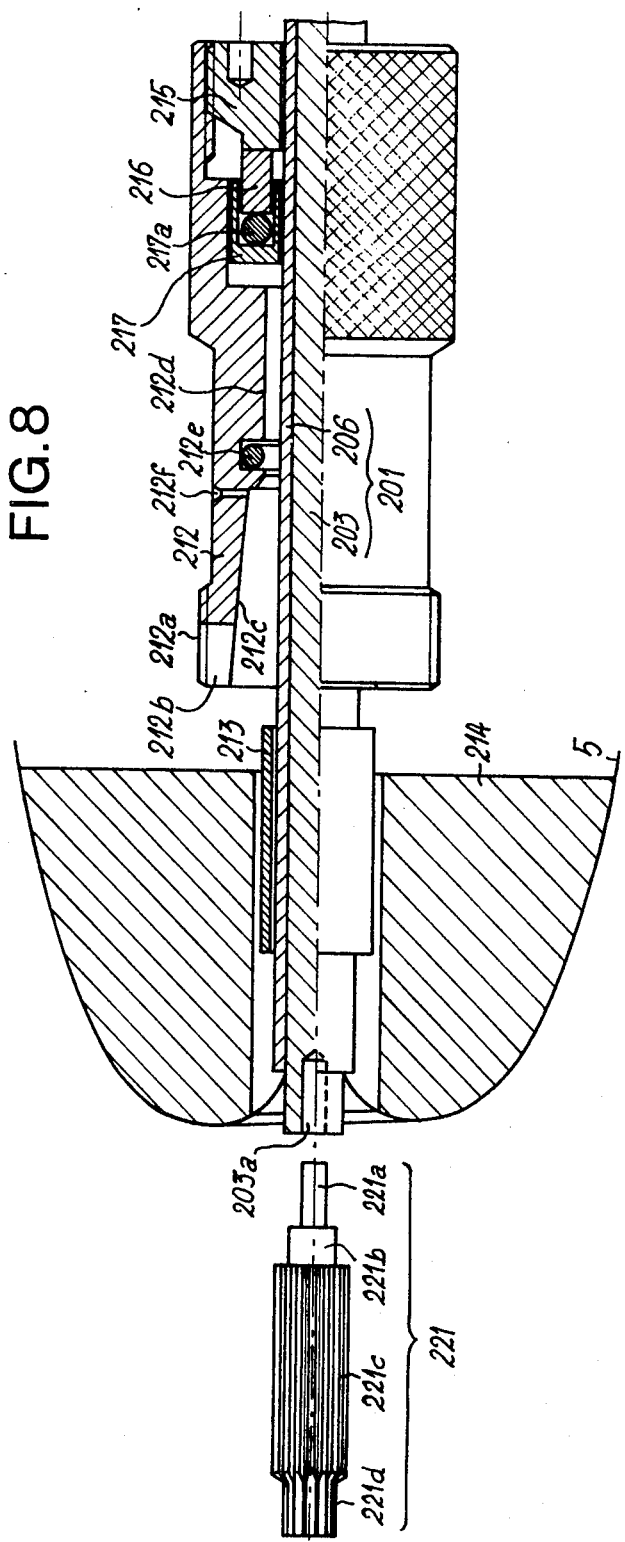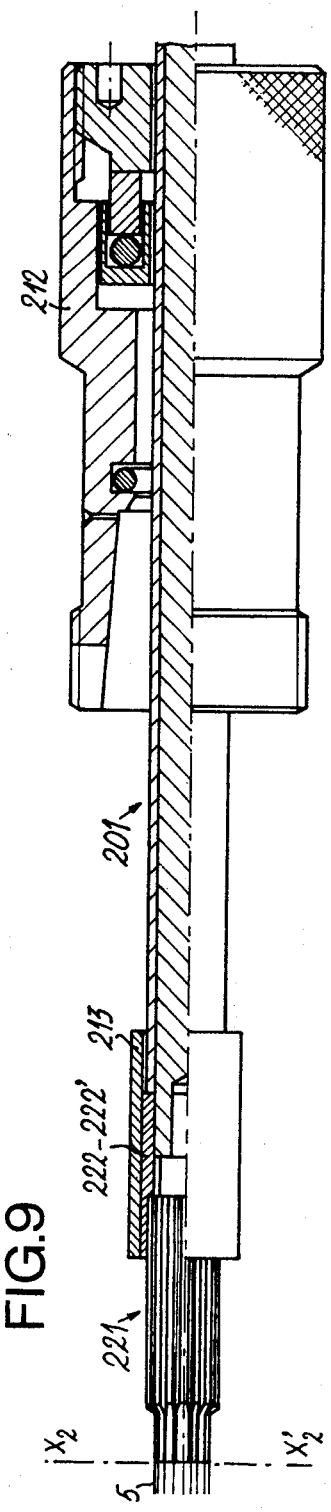
FIG.8
FIG.9

METHOD FOR ON-SITE CONNECTION OF CABLES WITH OPTICAL FIBRES

This is a division of application Ser. No. 762,312, filed Jan. 25, 1977, now U.S. Pat. No. 4,108,534.

BACKGROUND OF THE INVENTION

1. Field of the Invention

The invention relates to a method for on-site connection of two transmission cables comprising optical fibres, each cable having a protective enclosing a central core formed with regularly spaced grooves over its periphery, each groove holding a fibre provided with a thin sheath of uniform thickness.

Cable connections of the aforementioned kind are made when a complete transmission line is first laid (allowing for the limits to the length of the sections imposed by the storage, transport and handling conditions) or during the repair of lines already in service. They have to satisfy a number of essential conditions, as follows:

They must be easy to make on site, usually in a trench, in spite of the great fragility of the fibres;

The connections must be rigid and stable over a long period irrespective of variations in temperature, humidity, etc., and The resulting "insertion losses" on each track must be as small as possible.

2. Description of the Prior Art

U.S. patent application Ser. No. 744,595 filed Nov. 24, 1976 in the names of the present Applicants describes a method entitled "A process and apparatus for connecting cables comprising optical fibres, the position of the sections being located" whereby the cable sections are provided with connecting terminals in the factory, i.e. before being transported to the site. This system has the disadvantage of not being applicable either to repairs or to cases in which the terminals have an unacceptable bulk.

U.S. Pat. No. 3,969,015 in the name of "G. le NOANE" dated July 17, 1975 describes a system entitled "A connector for transmission cables comprising optical fibres" wherein use is made of half-connectors each comprising at least one deformable core formed with apertures for the fibres and a similarly apertured rigid piston bearing on the core so as to deform it and hold the fibres in position. This system has the disadvantage of being workable only where there is plenty of space, e.g. at stations.

Other known connections systems are supposed to be workable on site but practically all have the following disadvantages:

The fibres to be removed from the sheath which is an extremely delicate operation;

After removal from the sheath, there is a serious risk that the fibres will be broken, which complicates the operations of preparing the end surfaces of the fibres;

The insertion, positioning and securing of the thus-prepared bared fibres in centering components involve new risks of breaking and difficulties of all kinds; and The corresponding solutions are mechanically complicated and expensive.

SUMMARY OF THE INVENTION

An object of the invention is to provide a method and apparatus of the initially-defined kind which obviates all the above mentions difficulties.

To this end, a method according to the invention is characterized in that it comprises the following steps:

(a) The end of a first cable is bared over a given length, the thus-uncovered fibres are moved towards the exterior and provisionally secured on to a holder surrounding the cable, (b) After the fibres have been removed, the core is cut perpendicular to its axis and an at least partly grooved portion of an extension core is rigidly secured thereto, (c) The fibres are bent back into the grooves in the portion and rigidly secured therein, (d) The core portion and the fibres which it bears are cut perpendicular to its axis, (e) The ends of the fibres are cleaned, polished if necessary and coated with a lubricant providing protection and continuity of index, (f) The same operations are performed on the end of a second cable, using another core portion such that its cut surface is exactly identical with that of the preceding portion, (g) Each of the core and portion assemblies is permanently secured by means which hold it rigid, (h) The two cut surfaces are placed in contact, using position locating means to ensure that they are in a predetermined mutual angular position, and the two portions are mutually aligned by aligning means, and (i) The portions are placed against one another at a predetermined pressure, using clamping means.

Apparatus for working the method is characterized according to the invention in that it comprises:

(a') The aforementioned core portions, i.e. two extensions of revolution, at least partly formed with grooves having the same angular pitch as the fibres in the cables.

(b') The position-locating means for "reconstituting" the single component without sawing losses—i.e., two flat calibrated keys cooperating respectively with two complementary diametrically opposite slots at the free ends of each extension.

(c') Means for rigidly holding each core-extension assembly i.e., two hemicylindrical shells finally enclosed in a cylindrical sheath, (d') Means for aligning and joining the extensions—i.e., two solids shells having semicylindrical inner surfaces cooperating with male cylindrical surfaces of the extensions, and having male biconical outer surfaces cooperating with two female cones which have previously been slidably mounted on the armouring of the non-bared parts of the cables, the two female cones being finally joined by a connecting nut, and (e') Clamping means, i.e. a threaded plug in the rear part of one the female cones for pressing against the nearest sheath whereas the other sheath abuts a re-entrant flange in the solid shells.

As will be shown clearly hereinafter, the problem posed by the invention is solved in satisfactory manner since:

The fibres are not bared or subjected to any dangerous handling and

The various required kinds of alignment of the fibres can be brought about without excessive complication.

More particularly, the extensions can be obtained by sawing a single machine-made component perpendicular to its axis, and the solid shells can be obtained by sawing another single machine-made component along a diametral plane. In both cases, this ensures perfect correspondence between the cooperating components.

Each extension can have a journal at one end adapted to cooperate with a complementary recessed bore after the cut in the corresponding cable core. The result is a particularly simple method of securing the extension in the core of the associated cable by combined fitting-in and adhesion.

Each extension can have a grooved part, preferably with V-shaped grooves having a rectilinear bottom from one end to the other of the part, the part having an intermediate part with a diameter such that the fibres are enclosed in the grooves, and cooperating with the solid shells, and the extension also has a part at the other end having a smaller diameter such that the fibres project from the grooves.

The result is a simple method of:

Forming the cylindrical surfaces of the extensions adapted to cooperate with the solid shells;

Accurately centering the fibres at the bottom of the shallow grooves in the place where they are subsequently sawn; and Providing an adjacent hollow space for subsequently introducing a lubricant providing protection and continuity of index.

Each extension can comprise an intermediate, smooth part having a smaller diameter than that corresponding to the bottom of the grooves of each cable. In this manner, the fibres can diverge slightly in radial or peripheral directions, between the grooves in the cable and the grooves in the extension.

Both extensions, i.e. the single component from which they are formed, can be made of a material such as silica or alumina ceramic, having a hardness comparable with that of the material forming the fibre core, thus facilitating the sawing of each extension fitted with fibres.

The two keys can have somewhat different thicknesses (and the same applies to the cooperating slots), to prevent any risk of rotating one extension through 180° with respect to the other.

Other aims, characteristics and advantages will be clear from the following detailed description of a preferred embodiment and the accompanying drawings in which:

BRIEF DESCRIPTION OF THE DRAWINGS

FIG. 4 is an axial section through a first end of a cable to be connected, after baring over a certain length, spreading out the optical fibres, forming a recessed bore in the cable core and positioning an extension;

FIG. 5 is an axial section through the same first end of the cable after insertion and sticking of the extension, bending back the fibres and securing them thereon, and rigid securing of the assembly before the extension and fibres are sawn;

FIGS. 8 and 9 are views corresponding to FIGS. 4 and 5 respectively, showing the second end of the cable to be connected

DESCRIPTION OF PREFERRED EMBODIMENTS

Figure 1:
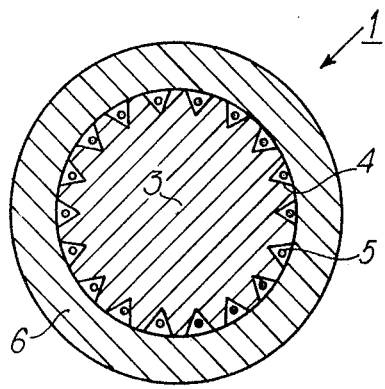
FIGS. 1 and 2 respectively are diagrammatic cross-sections of a cable comprising optical fibres and of a fibre.
Figure 2:
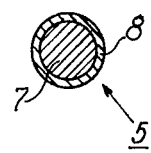

As shown in FIG. 1, a transmission cable comprising optical fibres is substantially made up of a central core 3 having a periphery formed with grooves 4 (V-shaped in the present case) regularly spaced out and each holding an optical fibre 5, the assembly being surrounded by protective armouring 6. As shown in FIG. 2, each optical fibre 5 in turn comprises a core 7 and a very thin sheath 8 having a uniform thickness, e.g. of the order of a few $\mu$m (micrometers)

It is not of importance to the invention whether the central cable core is armoured or not, whether the grooves are straight or helical or continuous or discontinuous in direction, or whether the fibres are disposed with or without tension or freely in the grooves. It is simply assumed that it is necessary to connect two cables of the previously defined kind on site, e.g. after a repair.

Figure 3A:
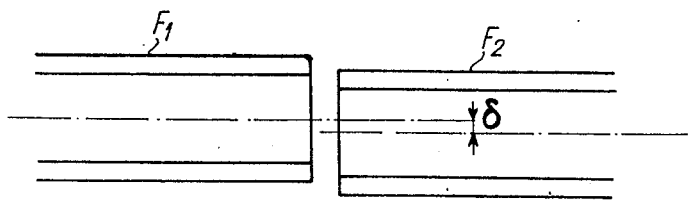
FIGS. 3A, 3B and 3C are diagrams of connections between fibres showing the three causes of faults resulting in "insertion loss"

When it is necessary to connect two elementary optical fibres $F_1 F_2$, an attempt is made to reduce the following faults to a minimum:

The linear transverse error $\delta$ (FIG. 3A);

The angular error $\alpha$ (FIG. 3B); and

Figure 3B:
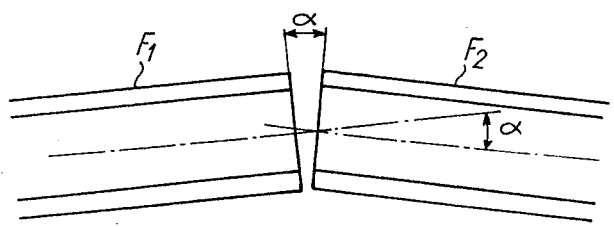
Figure 3C:
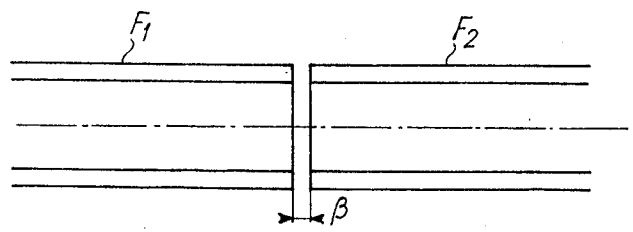

The longitudinal linear error $\beta$ (FIG. 3C).

Figure 11:
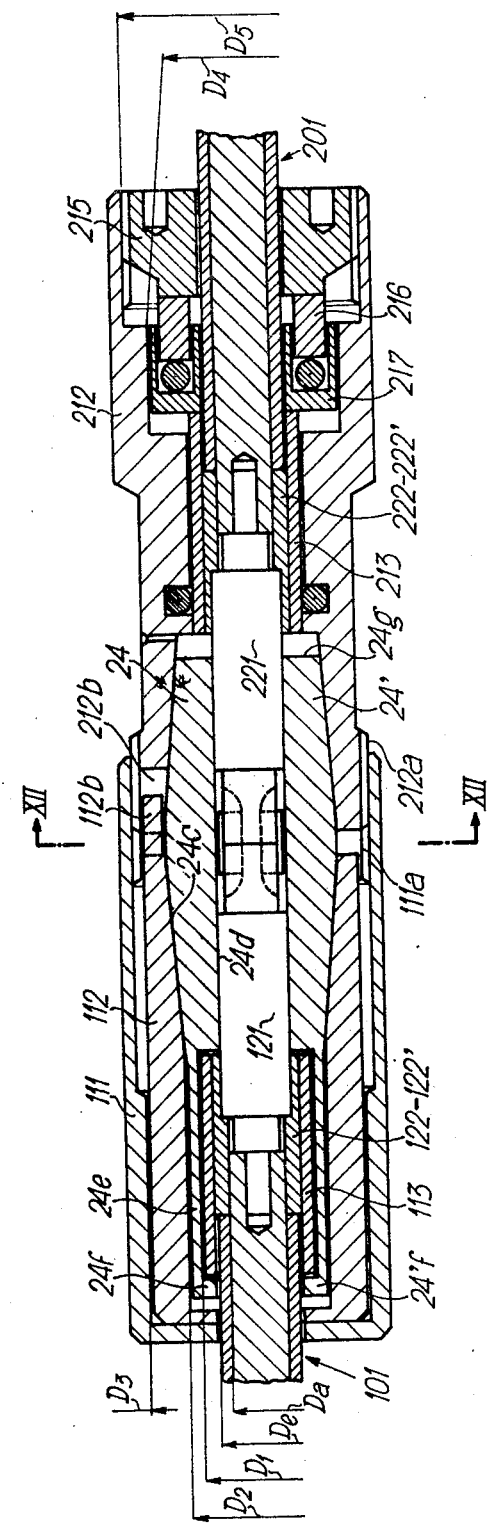
FIG. 11 is an axial section through the assembly formed by the two joined cable ends.

In the case where two cables 101, 201 (FIG. 11) of the previously-defined kind are joined on site, the object of the inventions is to eliminate the previously-mentioned three defects in the case of each elementary fibre.

For simplicity, the different components necessary according to the invention will be described in the order in which they are used in the different steps of the method of joining according to the invention.

Firstly, with regard to the preparation of the end of a first cable 101 for joining (FIG. 4) the following components of revolution are threaded on to the armouring 106:

A cylindrical recessed joining nut 111 having a rear end formed with a central circular aperture having a diameter of approximately $D_e$ (FIG. 11) and a front open end having internal threading 111a;

A clamping cone 112 having a cylindrical outer surface of diameter $D_3$ for sliding with slight clearance in nut 111, a rear end similar to the end of the nut and an open front end, near which the inner surface of component 112 has the shape of a female cone 112c having a diameter increasing towards the exterior, whereas the lateral inner surface of component 112 subsequently, at 112d, becomes cylindrical with diameter $D_2$; the open end of the component has an axial stud 112b; and A cylindrical sheat 113 having an inner diameter of approximately $D_3$ and an outer diameter $D_1$.

Next, the cable is bared by removing the armouring 106 for a sufficient distance to obtain a good length of exposed sheathed fibres, and the fibres spread out by temporary securing them, e.g. by pieces of adhesive tape, to a holder 114 of revolution, having a central place which is a parabola or shaped so that the fibres are not likely to be broken by being bent at excessively small radii of curvature.

Next, cable core 103 is cut at a predetermined length $L_1$ from the free edge of armour 106, and is formed with a coaxial bore 103a having suitable dimensions for fitting an end journal 121a of an "extension" member 121 adapted to form half of a "bridge" for interconnecting the cores of the two cables.

Component 121 is made of a material such as silica or alumina ceramic, having a hardness comparable with the material forming the fibre core. Component 121 is of revolution and starting from journal 121a, comprises the following in order: a short cylindrical part 121b having a diameter slightly less than $D_a$, a cylindrical part 121e having a diameter slightly greater than $D_a$, and a cylindrical part 121d having the same diameter as 121b. Part 121b is smooth whereas parts 121c, 121d are grooved and have the same angular pitch as the grooves in core 103, and are also shaped so that the bottoms of the grooves in parts 121c, 121d are rectilinear, in the axial direction and at the same radial distance from the axis of component 121 as the distance between the bottoms of the grooves in core 103 and the cable axis.

Accordingly, journal 121a of component 121 is fitted into the afore-mentioned bore 103a in the core of cable 101 and secured by means of a commercial universal adhesive such as those known by the commercial names ARALDITE, CYANOLITE, etc., after which the fibres are placed in grooves 121c, 121d and secured therein with the same adhesive.

Figure 6:
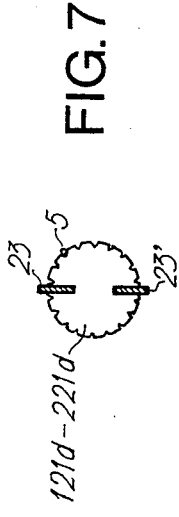
FIGS. 6 and 7 are cross-sections of the extension along lines VI—VI and VII—VII in FIG. 5.
Figure 7:
Figure 10:
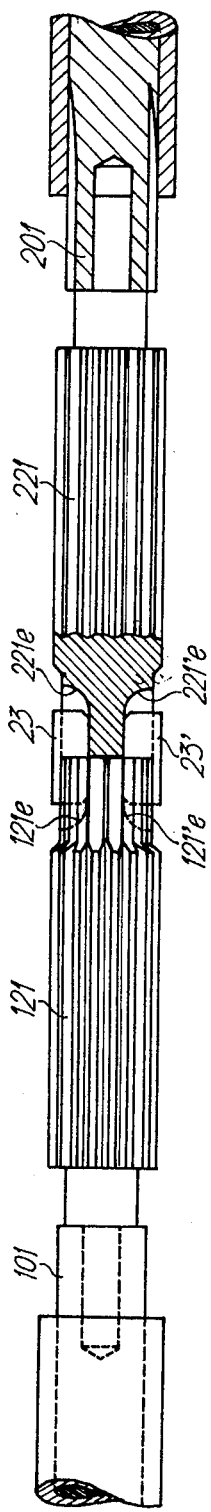
FIG. 10 is an axial section through the extensions when joined.

Note that, with regard to the securing of component 121 to core 103, it is unnecessary to mark the position of component 121 in any way with respect to the core, since the smooth part 121b of member 121 enables the fibres, which are not stuck at this place, to undergo slight deflections in either the radial or the peripheral direction without dangerous curvature. In addition, the grooves in part 121c are at least as deep as in core 103, so that the fibres can be completely embedded therein, whereas the grooves in part 121d are considerably less deep so that the fibres project therefrom (see FIGS. 6 and 7 respectively).

Next, two hemicylindrical shells 122, 122' having substantially the same thickness as armour 106 are placed one each side of region 121c of component 121 secured to core 103 so that an inner annular shoulder of the shells abuts shoulder 121b—121c of component 121. The shells are secured, using the aforementioned adhesive, to both part 121c and cable core 103, after which the shells are covered with sheath 113, which does not overlap them except on the side opposite the future join. The sheath is then secured to the shells, using the same adhesive. The thus-prepared cable end 101 is then in the state shown in FIG. 5, fibres 5 overlapping in random manner the free end of component 121.

Next, part 121d and the fibres thereon are cut along a plane $X_1 X'_1$ perpendicular to the axis of component 121. If required, the cut surface is polished, cleaned and coated with a lubricant giving both protection and index adaptation.

Exactly the same operations are repeated at the end of the other cable 201 to be joined (FIGS. 8 and 9). It is unnecessary, therefore, to describe them again; in the two cases, the reference numbers of corresponding components differ only in the hundreds figure (2 instead of 1).

Note, however, that in the second case there is nothing corresponding to the connecting nut 111, and the clamping cone 112 is replaced by a clamping cone 212 which is likewise of revolution but has a substantially different shape. The front end of cone 212 has an external thread 212a (for cooperating with the aforementioned thread 111a of 111) and a slot 212b (for cooperating with stud 112b of cone 112). The front end is recessed in the form of a female cone 212c having a diameter increasing towards the exterior, a radial duct 212f opening into the bottom of the cone for introducing lubricant. The center part of member 212 has a cylindrical surface 212d having a diameter of approximately $D_2$ and is formed with an annular groove holding a sealing-tight O-ring 212e. The rear end has recesses having two diameters, i.e. $D_5$ towards the exterior and $D_4$ ($D_4 < D_5$) internally. An adjusting and clamping plug 215 is screwed fairly tightly into diameter $D_5$ recess, which is threaded, the outer front surface of plug 215 having diametrically opposite recessed holes (for engaging two side studs of a semi-circular dynamometric flat key, not shown). The following are disposed in sucession on the front of the plug: A first cylindrical washer 216 and a second washer 217, formed with a rear recess containing a resilient O-ring 217a, the first washer 216 engaging in the recess so as to bear on the seal. Washer 217 slides with gentle friction like a piston, in the aforementioned diameter $D_4$ recess in component 212. Note also that component 211, corresponding to component 121, is obtained at the same time as component 121, by transverse sawing of single component 121 - 221 (not shown) into two halves, component 121 - 221 having been machine-made in a single operation, after which parts 121c, 121d, 221d, 221c of the single component are formed with grooves "in line" from one end to the other. Region 121d - 221d of the single component, before being sawn into two halves, has two calibrated, diametrically opposite, deep radial and longitudinal grooves, the difference between the thickness of the grooves being sufficient for them to be distinguished from one another. As we shall now see the deep grooves 121e, 121'e, 221e, 221'e, are adapted to cooperate with two keys 23, 23' in the form of flat calibrated strips and complementary with the grooves, so as to "reconstitute" and maintain the initial relative angular positions of components 121 and 221.

After the two ends of cables 121, 201 have been prepared in the previously-described manner they are in the state shown in FIGS. 5 and 9 and it is only necessary to join two cables (FIG. 11) in the following manner:

The sawn surfaces $X_1 X'_1$ and $X_2 X'_2$ of extensions 121, 221 respectively are joined and keys 23, 23' are placed in the corresponding grooves. Next, two shells 24, 24' are placed one on each side of the extensions, the shells having been formed by sawing a single shell of revolution (not shown) along a diametral plane. Shells 24, 24' are therefore identical. Shell 24, for example, has an inner cylindrical surface 24d having a diameter equal to that of parts 121c, 221c of the extensions, and an external male biconical surface 24c having a diameter which decreases towards the ends of component 24 and having the same conicity as the female cones 112, 212. At one end, there is a cylindrical rail 24e having an inner diameter $D_1$, an outer diameter $D_2$ and a free end terminating in a re-entrant front part 24f having a semi-circular cut, whereas the other end 24g is cut relatively short.

Figure 12:
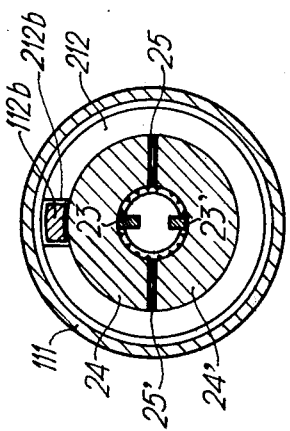
FIG. 12 is a cross-section along line XII—XII in FIG. 11.

Shells 24, 24' are positioned by means of interposed resilient flat seals (FIG. 12), so that the re-entrant parts 24f, 24'f come in contact with that front edge of sheath 113 which is furthest from the join.

All the described components, except for the extensions and seals, are of metal.

In order to complete the join, the two clamping cones 112, 212 are first brought together, thus holding shells 24 and 24' by fitting stud 112b into slot 212b, after which the thread 111a of the connecting nut 111 is screwed on to thread 212a. At this stage, the fibres of the two cables are disposed in pairs face to face without any error δ (FIG. 3A) or α (FIG. 3B).

In order to eliminate errors β (FIG. 3C) plug 215 is clamped using the aforementioned dynamometric key. As a result, extension 221 is pushed by components 216, 217, 213, 122 and 122' against extensions 121 which in turn abuts the re-entrant parts 24f, 24'f via components 222, 222' and 113, until a predetermined contact force is obtained.

Finally, lubricant of the previously-stated kind is injected under pressure through 212f and infiltrates though the grooves to the contacting extension surfaces $X_1 X'_1$ and $X_2 X'_2$.

What is claimed is:

1. A method of on-site connection of two transmission cables comprising optical fibres, each cable having a protective armouring enclosing a central core formed with regularly-shaped grooves around its periphery, each groove having a fibre comprising a thin sheath of uniform thickness therein, the method being characterized in that it comprises the following steps:
   (a) the end of a first cable is bared over a given length, the thus-uncovered fibres are bent away from the core and provisionally secured on to a holder surrounding the cable;
   (b) after the fibres have been bent away from the core, the core is cut perpendicular to its axis and an at least partly grooved portion of a first extension core is rigidly secured thereto;
   (c) the fibres are bent back into the grooves in the said portion and rigidly secured therein;
   (d) the first extension core portion and the fibres which it bears are cut perpendicular to its axis;
   (e) the ends of the fibres are cleaned, polished if necessary and coated with a lubricant providing protection and continuity of index;
   (f) the same operations are performed on the end of a second cable using a second extension core portion such that its cut surface is exactly identical with the cut surface of the first extension core;
   (g) each of the central core and extension core portion assemblies is permanently secured to each other by a tubular securing means which holds them rigid;
   (h) the two cut surfaces are placed in contact, using position-locating means to ensure that they are in predetermined mutual angular position, and the two portions are mutually aligned by said position-locating means; and
   (i) the portions are placed against one another at a predetermined pressure, using clamping means.

2. A method according to claim 1, in which an adhesive is used for all the rigid securing operations.

* * * * *